United States Patent
Vande Haar et al.

(10) Patent No.: US 9,279,495 B2
(45) Date of Patent: Mar. 8, 2016

(54) PITCH-BASED SHIFTING

(71) Applicant: Deere & Company, Moline, IL (US)

(72) Inventors: William J. Vande Haar, Cedar Falls, IA (US); Jeffery M. Finley, Atwood, KS (US)

(73) Assignee: DEERE & COMPANY, Moline, IL (US)

( * ) Notice: Subject to any disclaimer, the term of this patent is extended or adjusted under 35 U.S.C. 154(b) by 155 days.

(21) Appl. No.: 14/067,357

(22) Filed: Oct. 30, 2013

(65) Prior Publication Data
US 2015/0120158 A1    Apr. 30, 2015

(51) Int. Cl.
F16H 59/66    (2006.01)
F16H 61/00    (2006.01)
F16H 61/16    (2006.01)
F16H 61/02    (2006.01)

(52) U.S. Cl.
CPC ............... *F16H 61/16* (2013.01); *F16H 59/66* (2013.01); *F16H 2059/663* (2013.01); *F16H 2061/0227* (2013.01); *F16H 2306/00* (2013.01)

(58) Field of Classification Search
CPC ............ F16H 59/66; F16H 2061/0227; F16H 2059/663
See application file for complete search history.

(56) References Cited

U.S. PATENT DOCUMENTS

| 4,804,074 | A | | 2/1989 | Kori | |
|---|---|---|---|---|---|
| 6,067,495 | A | * | 5/2000 | Fliearman et al. | 701/55 |
| 6,070,118 | A | * | 5/2000 | Ohta et al. | 701/65 |
| 6,275,760 | B1 | * | 8/2001 | Saito et al. | 701/55 |
| 6,516,261 | B2 | * | 2/2003 | Ohashi et al. | 701/51 |
| 8,014,925 | B2 | * | 9/2011 | Saitou et al. | 701/55 |
| 2012/0029776 | A1 | | 2/2012 | Staudinger et al. | |

FOREIGN PATENT DOCUMENTS

| DE | 10001486 C1 | 9/2001 |
|---|---|---|
| DE | 10320775 A1 | 12/2004 |
| DE | 19931141 B4 | 3/2005 |
| DE | 112005001726 T5 | 4/2010 |
| DE | 102011080712 A1 | 2/2013 |
| JP | S612924 A | 1/1986 |
| JP | S63312545 A | 12/1988 |
| RU | 2009123139 A | 12/2010 |

OTHER PUBLICATIONS

DE Search Report dated Jun. 17, 2015 (12 pages).

* cited by examiner

*Primary Examiner* — Tisha Lewis

(57) ABSTRACT

A computer-implemented method and a control system are described for controlling the shifting of a vehicle, at least in part, according to its pitch. The method includes using a pitch-detection mechanism to determine one or more indicators of the pitch of the vehicle. The method includes receiving, at one or more computing devices, a signal associated with the pitch indicators and determining a pitch value for shifting. The method further includes determining, by the one or more computing devices, a shift procedure based upon, at least in part, the determined pitch value and implementing the shift procedure to effect a shift operation for the vehicle.

18 Claims, 7 Drawing Sheets

PITCH-BASED SHIFTING

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to control of shifting operations in vehicle transmissions, including range shifting, shuttle shifting, and other shifting operations.

BACKGROUND OF THE DISCLOSURE

Work vehicles (and other vehicles) may usefully be equipped with multi-speed transmissions, including, for example, transmissions with multiple ranges and speeds. Operators of such vehicles may select the appropriate speed/range/gear for a particular task (or may have it selected on their behalf, such as by various computing systems included in the vehicles), based upon considerations that may include the desired wheel speed, the torque required for a particular operation, and so on. In certain instances, changes between speeds/ranges/gears may be effected via one or more actuators (e.g., one or more valves), which may control the delivery of pressure (or other actuating force) to particular shifting mechanisms, such as clutches. For example, algorithms associated with a transmission control unit ("TCU") may control the pressure applied at a given friction clutch in order to facilitate a shifting operation. Similarly, TCU algorithms may control hydraulic actuation of a shift collar to engage a selected gear.

SUMMARY OF THE DISCLOSURE

A control system and computer-implemented method are disclosed for controlling aspects of shifting operations in a vehicle based in part on vehicle pitch.

According to one aspect of the disclosure, a computer-implemented method for a vehicle with an associated pitch-detection mechanism includes determining, by the pitch-detection mechanism, one or more indicators of a pitch of the vehicle. The method includes receiving, at one or more computing devices, a signal associated with the one or more indicators of the pitch of the vehicle. The method includes determining, by the one or more computing devices, a pitch value for shifting based upon, at least in part, receiving the signal. The method includes determining, by the one or more computing devices, a shift procedure based upon, at least in part, the determined pitch value. The method includes implementing, by the one or more computing devices, the shift procedure to effect a shift operation for the vehicle.

One or more of the following features may be included in the disclosed materials. For example, the shift procedure may be determined to include an immediate reduction of a first clutch pressure from a current operating pressure to a shifting clutch pressure based upon, at least in part, the determined pitch value. The shift procedure may be further determined to include an immediate increase of a second clutch pressure from the shifting clutch pressure to an engagement clutch pressure upon identifying a ready state of a target shift range. The engagement clutch pressure may be determined based upon, at least in part, the determined pitch value. The shift procedure may be determined to include one or more of an adjusted starting clutch pressure and an adjusted clutch pressure engagement profile, the one or more of the adjusted starting clutch pressure and the adjusted clutch pressure engagement profile being determined based upon, at least in part, the determined pitch value.

The pitch-detection mechanism may include an accelerometer. Determining the pitch value may be based upon, at least in part, determining, with the accelerometer, a first acceleration value for the vehicle. Determining the pitch value may be further based upon, at least in part, determining a second acceleration value of the vehicle, based upon, at least in part, determining a wheel speed of the vehicle. The pitch value may be determined, at least in part, based upon subtracting the second acceleration value from the first acceleration value. Determining the shift procedure may include determining, based upon, at least in part, the determined pitch value, one or more of a starting time for the shift procedure, a target gear for the shift procedure, and a target range for the shift procedure. The shift operation may be one of a forward to reverse and a reverse to forward shift operation and determining the shift procedure may include determining a timing for clutch engagement based upon, at least in part, the determined pitch value. Determining the shift procedure may include determining a timing for brake engagement based upon, at least in part, the determined pitch value.

According to another aspect of the disclosure, a control system includes one or more processor devices and one or more memory architectures coupled with the one or more processor devices. The one or more processor devices are configured to receive a signal associated with the one or more indicators of a pitch of the vehicle, the one or more indicators being determined by a pitch-detection mechanism. The one or more processor devices are configured to determine a pitch value for shifting based upon, at least in part, receiving the signal. The one or more processor devices are configured to determine a shift procedure based upon, at least in part, the determined pitch value. The one or more processor devices are configured to implement the shift procedure to effect a shift operation for the vehicle.

One or more of the following features may be included in the disclosed control system. For example, the shift procedure may be determined to include an immediate reduction of a first clutch pressure from a current operating pressure to a shifting clutch pressure based upon, at least in part, the determined pitch value. The shift procedure may be further determined to include an immediate increase of a second clutch pressure from the shifting clutch pressure to an engagement clutch pressure upon identifying a ready state of a target shift range. The engagement clutch pressure may be determined based upon, at least in part, the determined pitch value. The shift procedure may be determined to include one or more of an adjusted starting clutch pressure and an adjusted clutch pressure engagement profile, the one or more of the adjusted starting clutch pressure and the adjusted clutch pressure engagement profile being determined based upon, at least in part, the determined pitch value.

The pitch-detection mechanism may include an accelerometer. Determining the pitch value may be based upon, at least in part, determining, with the accelerometer, a first acceleration value for the vehicle. Determining the pitch value may be further based upon, at least in part, determining a second acceleration value of the vehicle, based upon, at least in part, determining a wheel speed of the vehicle. The pitch value may be determined, at least in part, based upon subtracting the second acceleration value from the first acceleration value. Determining the shift procedure may include determining, based upon, at least in part, the determined pitch value, one or more of a starting time for the shift procedure, a target gear for the shift procedure, and a target range for the shift procedure. The shift operation may be one of a forward to reverse and a reverse to forward shift operation and determining the shift procedure may include determining a timing for clutch engagement based upon, at least in part, the determined pitch value. Determining the shift procedure may include determining a timing for brake engagement based upon, at least in part, the determined pitch value.

The details of one or more implementations of the disclosure are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example implementations of the disclosed system and method, as shown in the accompanying figures of the drawings described briefly above.

Currently, shift algorithms may be implemented without taking into advance account the pitch of the relevant vehicle, which may represent the angle formed by a front-to-back main axis of the vehicle with respect to a horizontal line. For example, if a vehicle is resting facing uphill on a hill with a particular, constant slope, the pitch of the vehicle may be positive (i.e., uphill) with a value essentially equal to the slope of the hill (sometimes referred to as percent grade). Certain algorithms may, for example, sense vehicle speed after a shift operation has begun, and may use changes in vehicle speed to estimate whether a vehicle is operating on a hill (or otherwise at a non-zero pitch) and the general steepness of the hill (or the vehicle pitch), then adjust aspects of shifting operations based on this estimate. This determination may be imprecise, however, and is also an after-the-fact determination, which may lead to detrimental effects on shifting performance. For example, by the time such an algorithm determines retrospectively (and often imprecisely) that a vehicle is on a hill, and implements appropriate changes in a shift procedure based on that determination, the shift procedure may fail (e.g., may kill the engine) or may result in an unpleasant shifting experience for a user of the vehicle (e.g., by way of strong jerking movement of the vehicle during the shift, by way of excessive loss of vehicle speed, and so on). Accordingly, for these (and other) reasons, the inventors have determined that it is useful to implement a system or method for preemptively determining vehicle pitch and implementing appropriate shift procedures based upon the determined pitch. As such, a pitch-based shifting ("PBS") method or similar control system, is disclosed herein.

Figure 1:
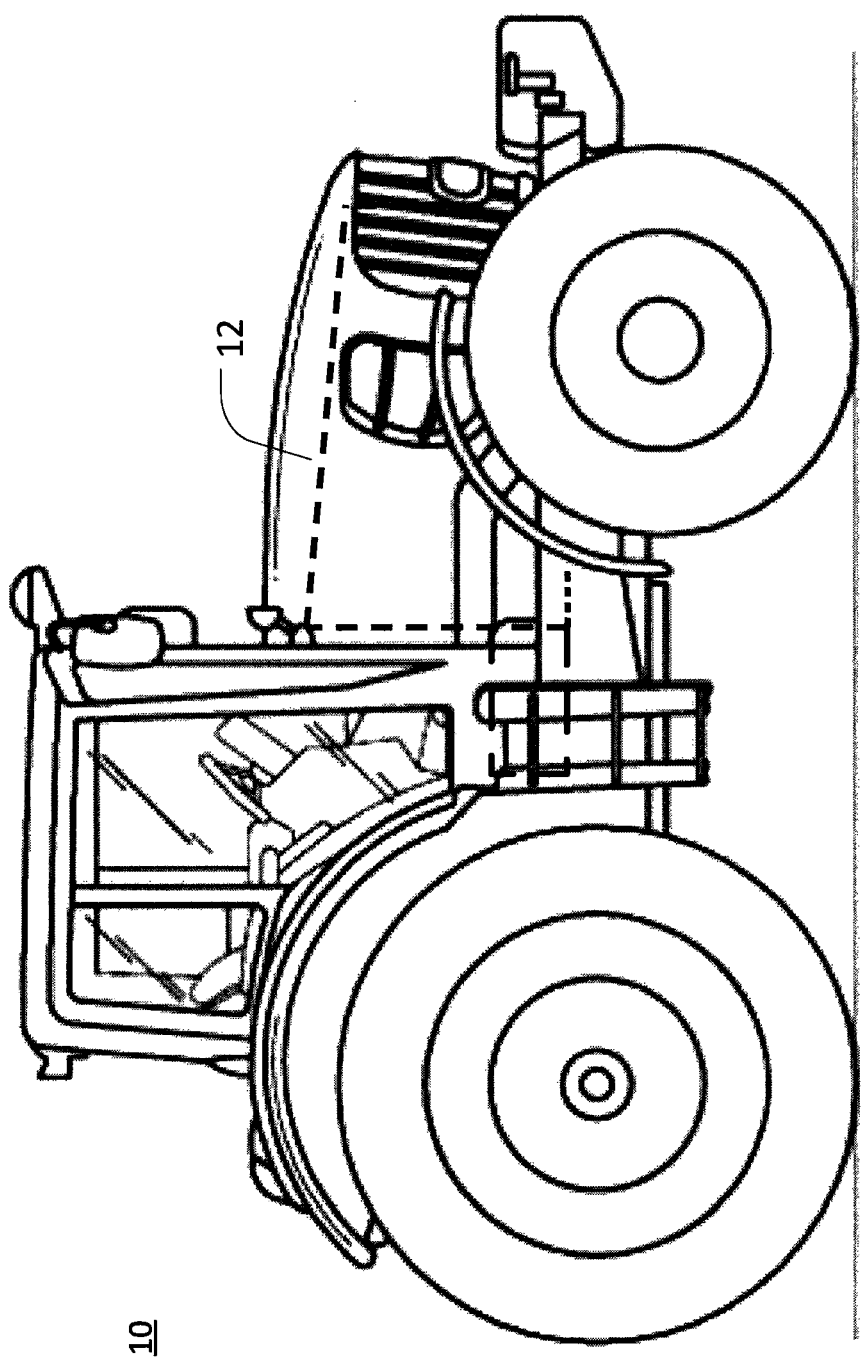
FIG. 1 is a side view of an example vehicle with respect to which the disclosed system and/or method may be implemented.

Referring now to FIG. 1, a PBS method may be implemented with respect to a variety of vehicles, including example work vehicle 10. Work vehicle 10, depicted here as a tractor, may include internal systems 12, which may include an engine (or other power source), a transmission, various control systems (including, for example, various computing devices such as a TCU), and so on. Work vehicle 10 may be configured to tow or drive various implements (e.g., harvesters, mower-conditioners, seeders, and so on) and may, in certain embodiments, be configured to provide power to external implements via a power take-off shaft (not shown) or various other power-transmitting connections (not shown).

Figure 2:
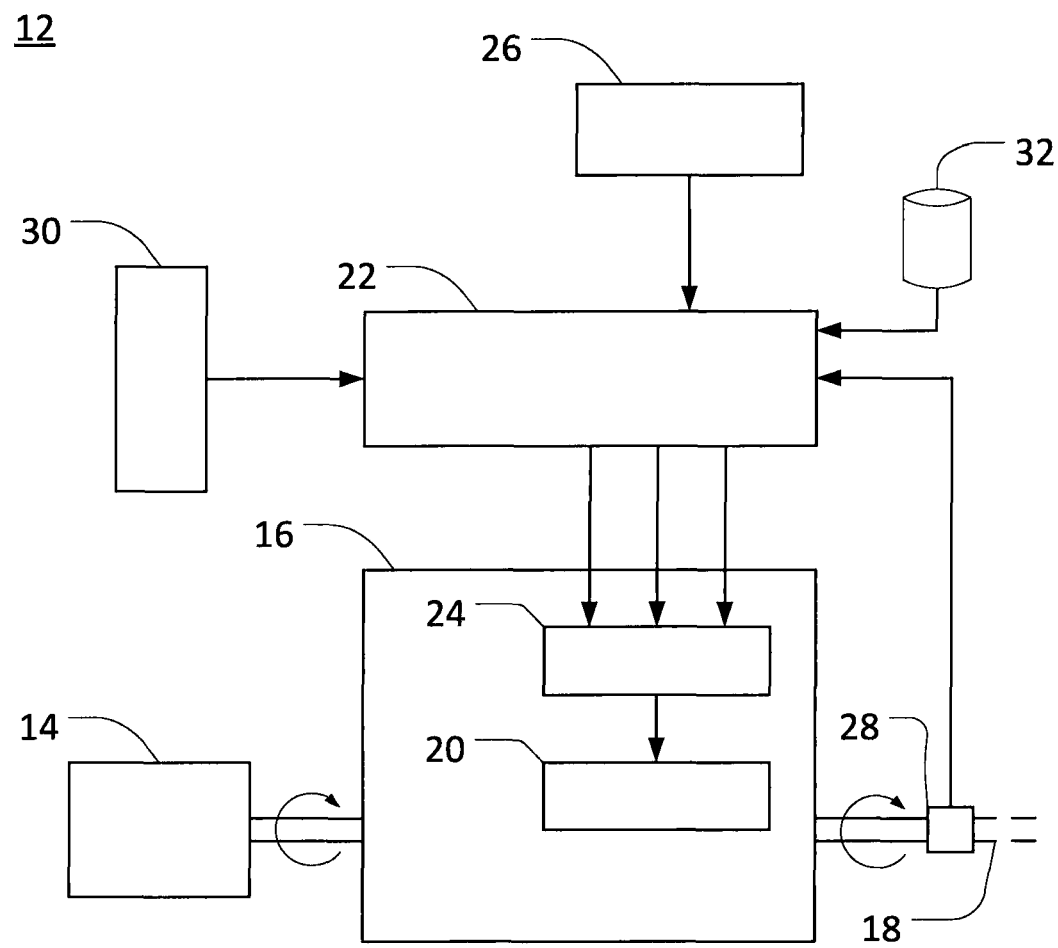
FIG. 2 is a diagrammatic view of power train systems of the example vehicle of FIG. 1.

Referring now also to FIG. 2, and as also discussed above, vehicle systems 12 may include power source 14, transmission 16, output shaft 18 (e.g., for transmitting power from transmission 16 to an axle of vehicle 10 (not shown)), and TCU 22. Transmission 16 may include various clutches 20, which may, in various embodiments, include synchronizer clutches, dog-collar clutches, friction clutches (e.g., wet clutches), reverse or other brakes (e.g., as part of a compound planetary gear set) and so on. Clutches 20 may be actuated by way of various actuators 24, which may include, for example, various valves for control of pressure delivery to a friction clutch or control of hydraulic actuation of cone-type synchronizer clutches. Actuators 24 may, in turn, be controlled by TCU 22, which may also control various other known components associated with shifting operations (e.g., hydraulic pumps for supplying hydraulic pressure, and so on) (not shown). Vehicle systems 12 may further include, for example, one or more pitch sensors 26, which may be configured to determine the pitch of vehicle 10 (or an indicator thereof) and provide a signal representing that pitch (or the indicator thereof) to TCU 22 (or various other computing devices (not shown)). Vehicle systems 12 may also include one or more speed sensors 28 as well as various other input devices 30, which may determine various aspects of vehicle operation (e.g., vehicle speed, various internal pressures, engine load, and so on) and/or various environmental parameters (e.g., ambient temperature) and may provide signals associated with such determination to TCU 22 (or various other computing devices). In certain embodiments, pitch sensor(s) 26, speed sensor(s) 28, and so on may communicate with TCU 22 via a CAN bus (not shown) of various known configurations.

It will be understood that the locations and interconnections of the various components in FIG. 2 are presented as part of an example configuration, and that various other configurations may be possible. For example, various actuators 24 may not be physically included in transmission 16, although they may provide signals or pressure, and so on, to components included in transmission 16. Similarly, for example, speed sensor 28 may be one of many speed sensors, and need not necessarily be located on output shaft 18. For example, speed sensor 28 (or other speed sensors) may be located at various wheels associated with vehicle 10 or may be located within transmission 16. Further, for example, transmission 16 may be arranged with a number of configurations and, in certain embodiments, may represent only one of multiple transmissions within vehicle systems 12. In certain embodiments, for example, transmission 16 may include both a speed module (not shown) and a range module (not shown). A speed module, for example, may include (or be associated with) one or more clutches for multiple fully-modulated power-shiftable speeds (e.g., for shifting with the engine under full load). In contrast, for example, the range module may include (or be associated with) one or more clutches and multiple synchronized range gears on parallel shafts, which may facilitate automated shifting, but which may not be configured to transmit power during shift operations. In this way, for example, a vehicle may be configured to operate at each of a set of speeds for any given range.

In certain embodiments, the instruction sets and subroutines of a PBS process (e.g., PBS process 200) may be stored on storage device 32 coupled to TCU 22, may be executed by one or more processors (e.g., as included in TCU 22) and one or more memory architectures (e.g., as included in or associated with TCU 22). Storage device 32 may include but is not limited to a hard disk drive, a tape drive, an optical drive, a RAID array, a random access memory ("RAM"), or a read-only memory ("ROM").

In certain implementations, a PBS process (e.g., PBS process 200) may be a stand-alone process. In certain implementations, a PBS process may operate as part of, or in conjunction with, one or more other processes and/or may include one or more other processes. Likewise, in certain implementations, a PBS process may be represented and implemented by an entirely hardware-based configuration, in addition or as an alternative to a configuration having PBS process 200 as a set of instructions stored in storage device 32.

Figure 3:
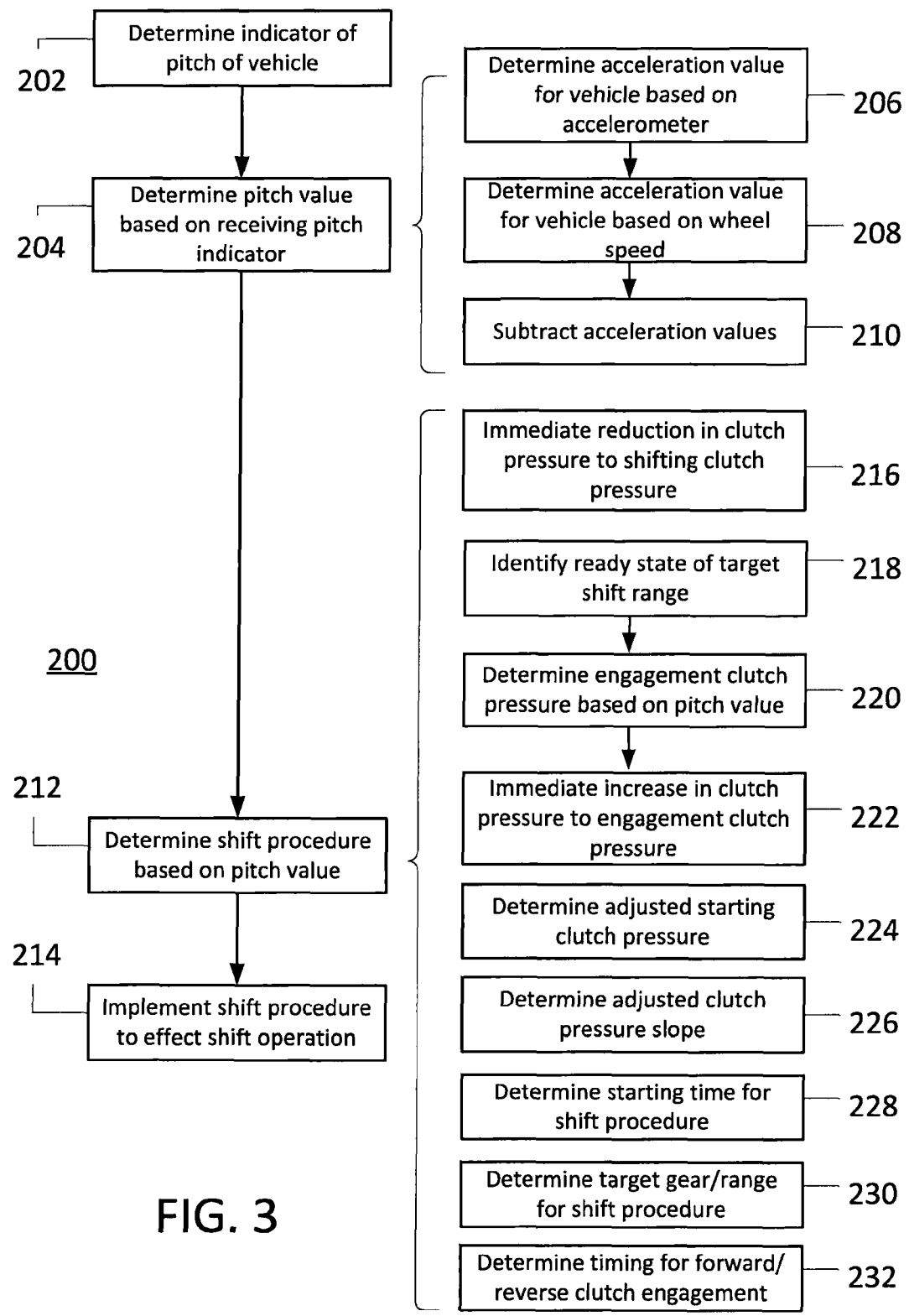
FIG. 3 is a process diagram associated with a method for conducting shifting operations for the example vehicle of FIG. 1.

For the following discussion, PBS process 200 will be described for illustrative purposes, although it will be understood that other configurations may be possible. Referring now also to FIG. 3, for example, there is shown a diagrammatic view of an example process that may be implemented by a PBS process, e.g., PBS process 200. With respect to vehicle 10, with which PBS process 200 may be associated (and within which it may be stored or executed), PBS process 200 may determine 202 an indicator of the pitch of vehicle 10. In certain implementations, for example, a pitch-detection mechanism (e.g., pitch sensor 26) may determine 202 an indicator of the pitch of a vehicle (e.g., a value representing the actual pitch of the vehicle, or a value that may be useful for deriving the pitch of the vehicle) and may transmit a signal associated with that indicator to TCU 22 (or another computing device). An indicator of pitch of a vehicle may include an direct indicator of vehicle pitch (e.g., a measurement of the orientation of a vehicle with respect to a horizontal reference) or an indirect indicator of vehicle pitch (e.g., a measurement of the slope of terrain on which a vehicle is traveling).

A value representing the actual pitch at which a shifting operation will be implemented may then be determined 204 (e.g., by interpreting the signal as representing the actual pitch of the vehicle or by deriving the pitch of the vehicle based upon the information included in the signal). In certain implementations, determining 204 a pitch for shifting may include determining an actual (or approximate) pitch of vehicle 10 for the time at which (or time period over which) a shifting operation will be executed. In certain implementations, determining 204 a pitch for shifting may include determining a pitch (or slope or percent grade, and so on) of terrain over which vehicle 10 is traveling (or will travel) for the time at which (or time period over which) a shifting operation will be executed. For example, the slope of a hill that vehicle 10 is climbing may be determined 204, which slope may correlate with the pitch of vehicle 10 when a shifting operation is executed for vehicle 10 during the climb.

As used herein, the "pitch" of a vehicle may refer to a rotation of the vehicle about an axis extending along a lateral centerline of the vehicle, as would correspond to inclination or declination of the vehicle in the forward and reverse directions of travel, or the fore and aft of the vehicle when stationary. Thus, "pitch" as used herein may be differentiated from the other conventional changes in vehicle attitude, namely "roll," which corresponds to side-to-side vehicle rotation about a longitudinal centerline of the vehicle, as well as "yaw," which corresponds to a change in vehicle heading resulting from rotation about a vertical axis extending through the vehicle.

Pitch sensor 26 may include a variety of mechanisms or instrumentation (and, as also noted above, may be one or multiple pitch-related sensors). For example, pitch sensor 26 may include one or more accelerometers, which may measure various acceleration values and utilize these values (or transmit them to another computing device, such as TCU 22) in order to determine 204 (or facilitate another device determining 204) an actual pitch value of the vehicle. For example, pitch sensor 26 (or TCU 22) may determine 206 an acceleration value for vehicle 10 based upon an accelerometer reading. It will be understood that discussion using terms such as the "actual pitch value" of vehicle 10 may include appropriately accurate estimates of the pitch of vehicle 10, as exact determination of pitch may be limited by instrument capabilities, environmental or topography factors, and so on.

In certain embodiments, pitch sensor 26 may include a multi-axis (e.g., three-axis) accelerometer, in which case a pitch value for vehicle 10 may sometimes be determined directly from the accelerometer measurements. For example, certain GPS devices included in various vehicles (e.g., various tractors) may include various accelerometers (e.g., one or more tri-axial accelerometers) which may be utilized as part of determining 204 a vehicle pitch. Other devices may also be utilized, including in various combinations. For example, certain embodiments may utilize gyroscopes, fluid-based devices (including fluid-based accelerometers), or other measurement devices.

In certain implementations, accelerometer measurements from pitch sensor 26 may be combined with other information in order to determine a pitch value for vehicle 10 (e.g., pitch sensor 26 may determine various pitch-related values, which may be utilized to derive the actual vehicle pitch). For example, in certain implementations, a forward/reverse acceleration value for vehicle 10 may be determined 208 based upon determining a wheel speed (e.g., as measured by speed sensor 28 or another sensor), then computing a derivative of the determined wheel speed (i.e., the wheel-based acceleration). Assuming little or no wheel slippage (or taking into account the degree of wheel slippage), this acceleration may then be appropriately subtracted 210 from an acceleration value determined 206 based upon a measurement by an accelerometer (e.g., pitch sensor 26), in order to remove from the determined 206 acceleration value the acceleration resulting from actual forward/reverse vehicle acceleration. The remaining acceleration value, accordingly, may be utilized (along with the known acceleration of gravity) to determine 204 an appropriate pitch value for the vehicle.

Having determined 204 an appropriate pitch value for shifting (e.g., a pitch value for vehicle 10), PBS process 200 may determine 212 an appropriate shift procedure for vehicle 10 based upon, at least in part, the determined 204 pitch value. Such a shift procedure may be associated with a variety of shift operations (e.g., range shifts, shuttle shifts, park-to-drive or park-to reverse shifts, forward-to-reverse shifts, synchronizer shifts, and so on) and may be determined to include or address various factors or steps such as the magnitude, timing and profile of pressure commands to a friction clutch, the timing of synchronizer engagement or disengagement, and so on. Once the shift procedure has been determined 212, it may then be implemented 214 by PBS process 200 (e.g., in combination with various other mechanisms or computing devices included in internal mechanisms 12)

In certain implementations, for example, PBS process 200 may determine 212 the shift procedure to include an immediate reduction 216 in clutch pressure to a shifting clutch pressure (i.e., to a clutch pressure at which a shift may be executed). For example, in a range shift using a traction clutch (and, for example, one or more synchronizers), the pressures of on-coming and off-going clutches included in clutches 20 (which may be represented by a single clutch, in certain embodiments) are often ramped down and up, respectively, in order to allow execution of a shift between ranges without detrimental performance of vehicle 10 during the transition between various loaded (and unloaded) states. However, if a vehicle is operating on a significant slope (e.g., a slope 8 degrees or more), this typical ramping of pressures may result in shift failure or other undesirable phenomenon (e.g., excessive vehicle deceleration if vehicle 10 is traveling uphill, excessive jerking of the vehicle, and so on). As such, for example, depending on the determined 204 pitch value, PBS process 200 may determine 212 a shift procedure in which the pressure of an off-going clutch is immediately dropped from the current (operating) pressure to a clutch pressure at which the change between ranges may be effected (e.g., through appropriate actuation of actuators 24). This immediate reduction 216 may beneficially contribute to such a range shift being executed before vehicle 10 loses too much speed due to the determined 204 pitch (or, in the case of down-hill travel, before vehicle 10 can gain too much speed).

With respect, for example, to the discussion above, it will be understood that relevant physics (e.g., the physics of fluid flow, as applied to hydraulic fluid used to pressurize relevant clutches) may prevent an actually instantaneous reduction (or other change) in pressure for a given clutch. Accordingly, the term "immediate," as used herein, may be utilized to convey the execution of a particular step, function, or operation, in a highly rapid manner, rather than in a necessarily instantaneous way. For example, with respect to reduction of pressure, discussion of an "immediate" pressure reduction will be understood to encompass a reduction in pressure that is as fast (or nearly as fast) as the physical structure and attributes of the relevant system may allow. It will be understood, however, that in certain implementations such a reduction (or other pressure change) may be effected by instantaneously (or near-instantaneously) "shutting off" the relevant clutch (e.g., via a near-instantaneous signal to a relevant actuator 24).

In certain implementations, continuing the discussion immediately above, PBS process 200 may further control an immediate increase in the pressure of an on-coming clutch (which may, in certain embodiments, be the same as the off-going clutch) once a target shift range (e.g., the target range being engaged by a synchronizer) has been appropriately engaged (e.g., has been appropriately aligned with a synchronizer for power transmission). For example, as (or after) the clutch pressure of an off-going clutch has been reduced 216, PBS process 200 may identify 218 that a target shift range is in a ready state (e.g., that appropriate gears have been aligned, a synchronizer has been fully engaged, and so on). PBS process 200 may also determine 220 an appropriate engagement clutch pressure (e.g., a target pressure for engagement of the target shift range for transmission of power), based upon, in certain implementations, the determined 204 pitch value. For example, if PBS process 200 has determined 204 a particularly high pitch value (i.e., that vehicle 10 is operating on a particular steep slope), PBS process 200 may determine (e.g., based upon experimentally determined pressure tables included in storage device 32) that an elevated engagement pressure may be necessary in order to prevent poor shifting performance (e.g., excessive vehicle deceleration or shift failure).

After, for example, determining 220 an appropriate engagement clutch pressure, PBS process 200 may direct (e.g., through the actuation of actuators 24, via TCU 22) an immediate increase 222 in on-coming clutch pressure from a starting pressure (e.g., the above-noted shifting clutch pressure) to the determined 220 engagement pressure. In other words, rather than slowly ramping pressure for an on-coming clutch, PBS process 200 may cause pressure to be increased as quickly as possible. In this way, for example, through the immediate reduction 216 (as discussed above) and subsequent immediate increase 222 of appropriate clutch pressures, even though a vehicle may be operating on a slope, a range (or other) shift may be executed without waiting for vehicle movement to determine vehicle pitch and without detrimental loss of vehicle speed, and so on.

Figure 4:
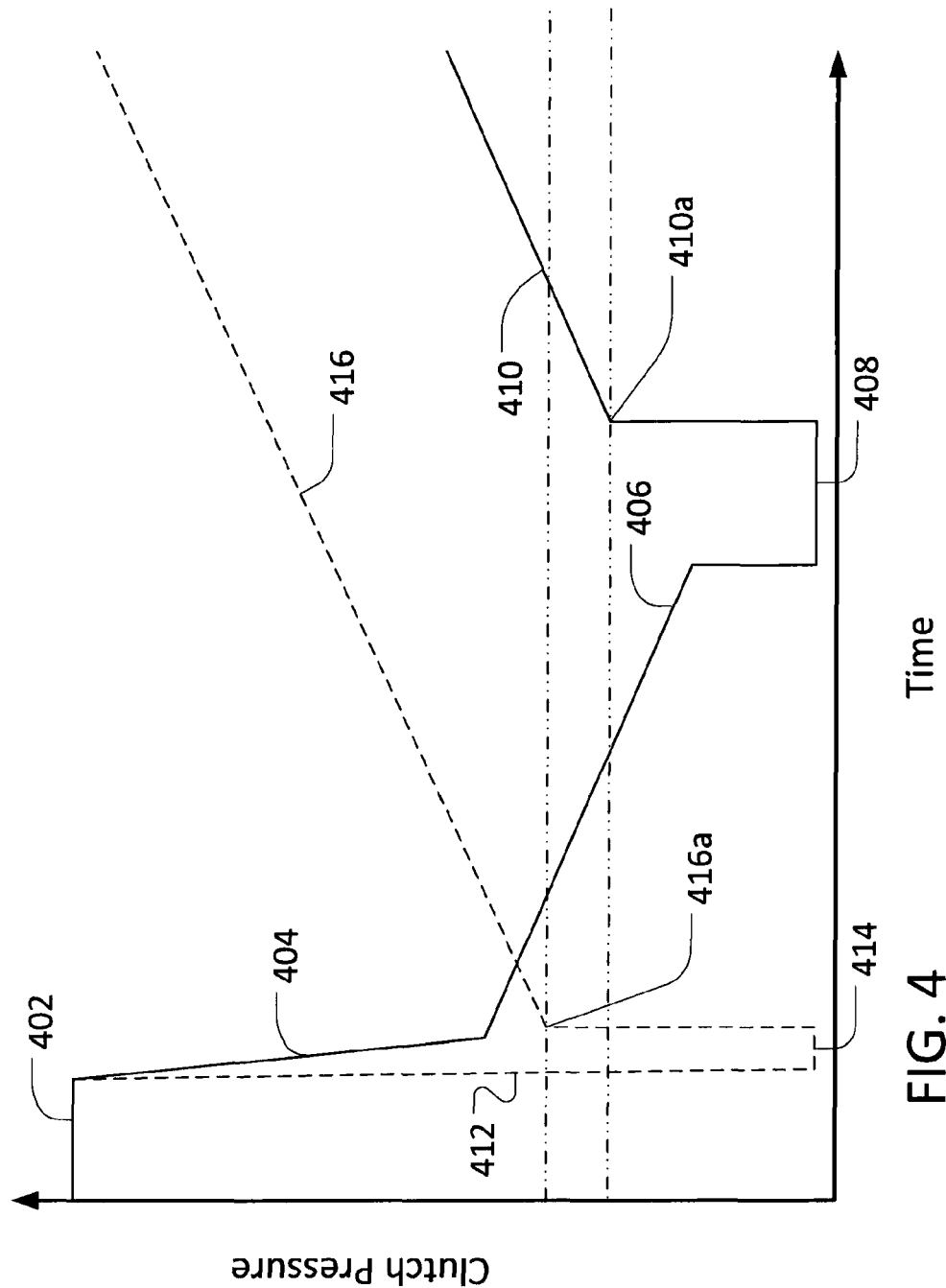
FIGS. 4-7 show pitch-based shift control profiles for various aspects of the shift procedure of the example vehicle in FIG. 1.

For example, referring now also to FIG. 4, for operation of vehicle 10 on flat ground (or operation of vehicle 10 on a slope, without adjustments to shifting procedures based on the pitch of the slope), a clutch operation may include modulated decrease 404, 406 in pressure from a fully-engaged clutch pressure 402, followed by extended minimum pressure period 408 (e.g., to permit alignment of on-coming gears or synchronizers), a rapid increase to an engagement pressure 410a, and a modulated increase 410 in pressure from engagement pressure 410a to a final pressure (not shown). In contrast, for example, PBS process 200, based upon determining 204 a pitch value, may implement 216 an immediate reduction in pressure 412, an accelerated shifting between ranges over minimum pressure period 414, followed by a rapid increase to elevated engagement pressure 416a and a modulated increase 416 in pressure from elevated engagement pressure 416a to a final pressure (not shown). In this way, for example, even though vehicle 10 may be traveling up a steep slope, the particular shifting operation (e.g., the particular range shift) may be effected without significant loss of vehicle speed.

It will be understood, based upon the discussion herein, that the slope of modulated increase 416 may be the same as the slope of modulated increase 410 or may, in certain implementations, be greater or less than the slope of increase 410 (e.g., as determined by PBS process based upon the determined 204 pitch) and that in certain implementations engagement pressure 416a may be equal to, less than, or greater than engagement pressure 410a (e.g., depending on the determined 204 pitch). It will further be understood that both of the profiles presented in FIG. 4 may represent idealized shifting profiles in various respects. For example, the increase in clutch pressure from minimum pressure periods 414, 408 to modulated increases 416, 410, respectively, may sometimes include a temporary spike in pressure above the indicated engagement pressures 416a, 410a, respectively. Similarly, actual pressure profiles during shifting operations may not follow entirely smooth curves (e.g., may fluctuate about a general trend-line).

Figure 5:
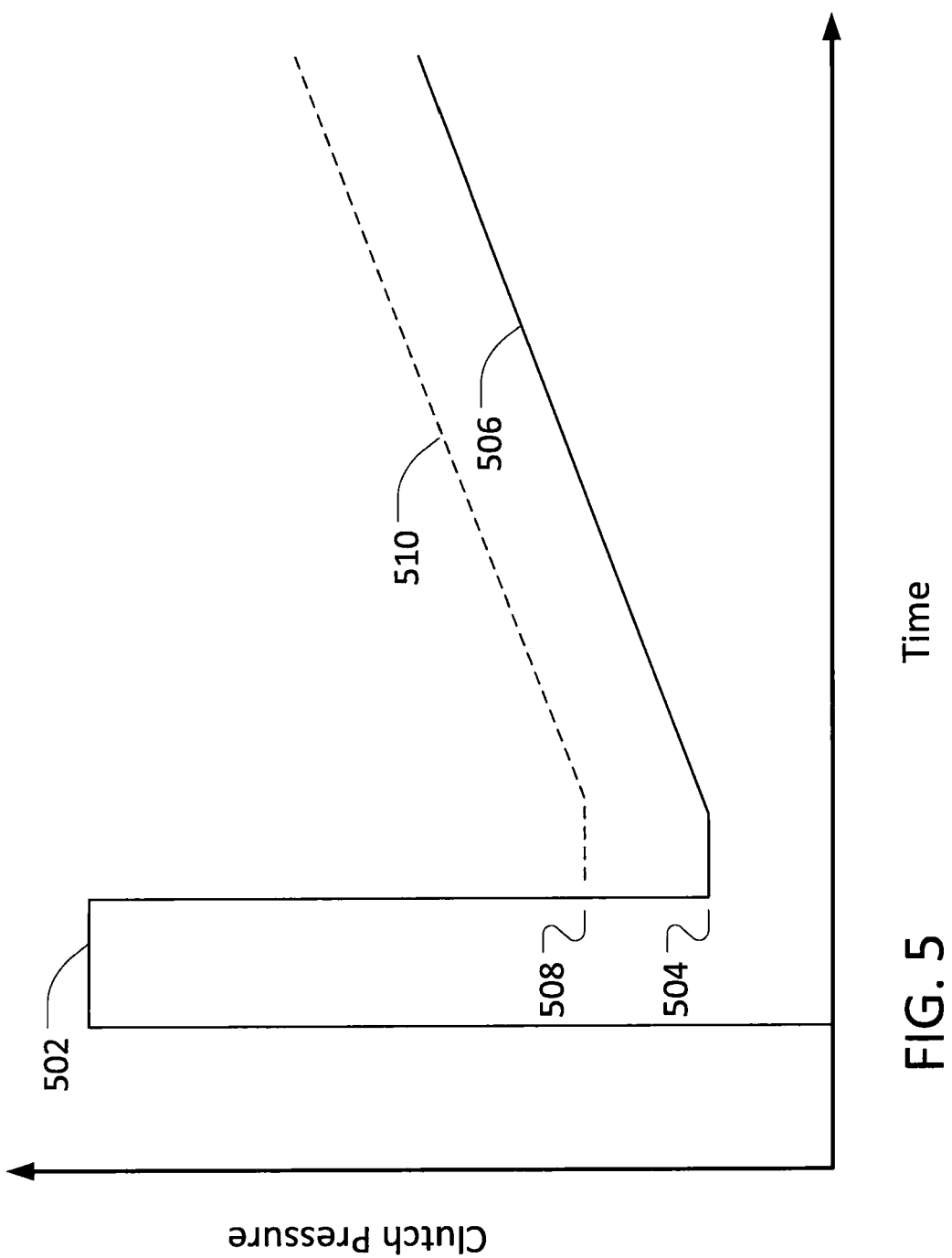

Referring now also to FIG. 5, in certain implementations, PBS process 200 may additionally or alternatively control the starting clutch pressure for a shift operation, based upon the determined 204 pitch value. For example, in a shuttle shift or a park-to-motion shift, known shift procedures may typically include a pre-fill or wake-up operation, in which an initial pressure spike is provided to an on-coming clutch, followed by an immediate drop to a starting clutch pressure, from which the pressure is gradually increased (i.e., ramped up) to a final pressure (not shown). For example, a reference shift operation (i.e., a shift operation for a vehicle traveling on level ground, or on a slope not reaching a particular threshold pitch) may include wake-up operation 502 (e.g., a pre-fill operation or fill pulse), followed by an immediate drop in pressure to starting pressure 504, then a gradual increase 506 in pressure until an appropriate final pressure (not shown) is reached. In contrast, PBS process 200 may determine 224 an adjusted starting pressure (e.g., adjusted starting pressure 508), based upon determining 204 a pitch value, which may, for example, be higher than a non-pitch-adjusted starting pressure (e.g., starting pressure 504). In certain implementations, the shift operation determined 212 by PBS process 20 may then include gradual increase 510 in pressure, which may exhibit the same (or similar) slope as the non-pitch-adjusted gradual pressure increase (e.g., gradual increase 506). In this way, for example, PBS process 200 may beneficially provide for a higher starting pressure for a shift operation (e.g., in a shuttle shift or park-to-motion shift) and thereby help to avoid detrimental shifting performance. Similar to the discussion above, in certain implementations, determining 204 a vehicle pitch before beginning such a shift operation may improve the performance of the operation. Although various linear command pressure profiles are presented as examples in the figures, it will be understood that PBS process 200 may modulate clutch pressure (e.g., determine 226 an adjusted clutch pressure engagement profile) in various ways, including with non-linear profiles such as curved pressure profiles, stepped pressure profiles, and so on.

Figure 6:
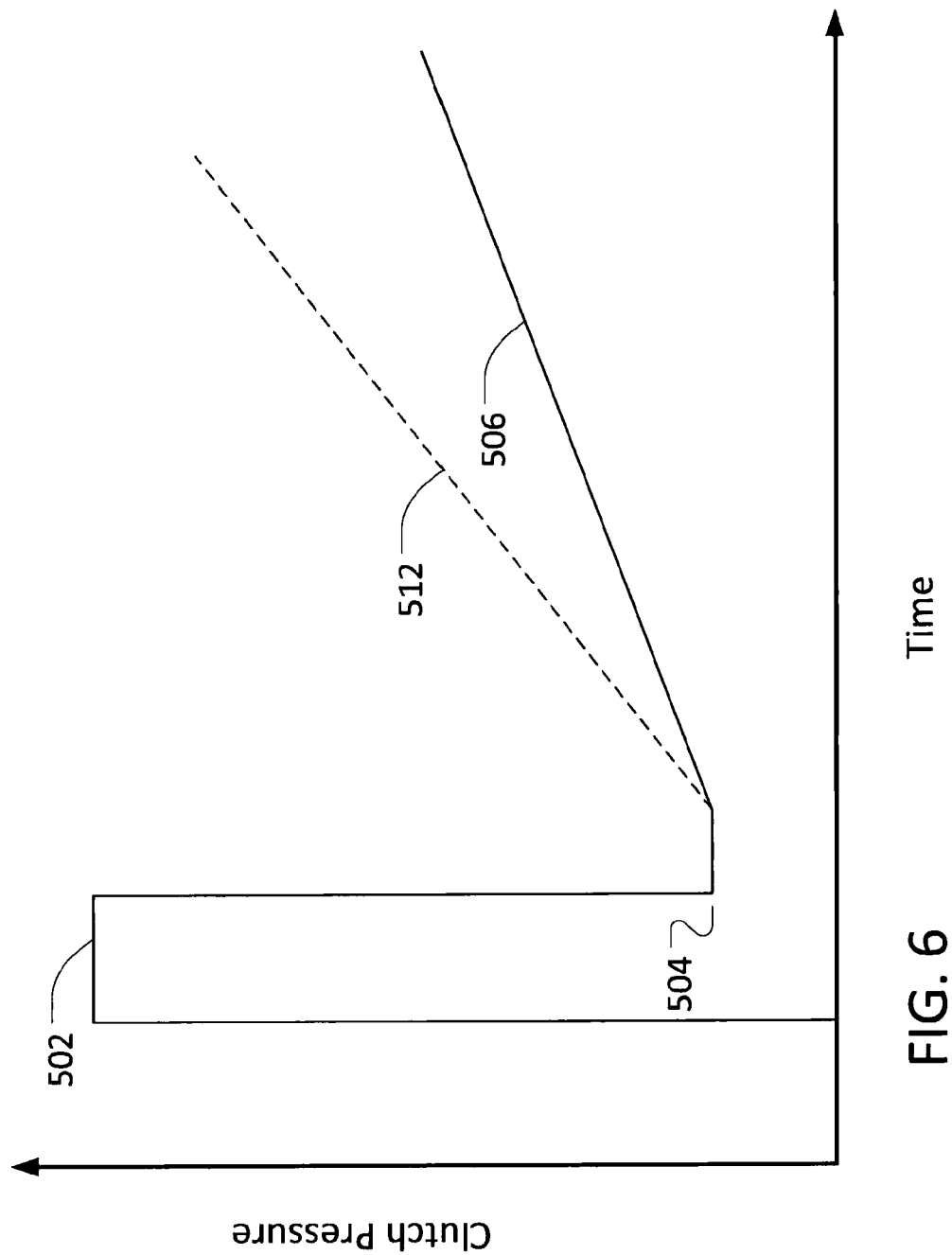

Referring now also to FIG. 6, in certain implementations, PBS process 200 may additionally or alternatively control the slope of a clutch pressure ramp-up (or ramp-down), based upon the determined 204 pitch value. For example, as also discussed above, in a shuttle shift or a park-to-motion shift, known shift procedures may typically include a pre-fill or wake-up operation, in which an initial pressure spike is provided to an on-coming clutch, followed by an immediate drop to a starting clutch pressure, from which the pressure is gradually increased (i.e., ramped up) to a final engagement pressure. This may result in a pressure profile, in FIG. 5 (and FIG. 4), in which a wake-up 502 is followed by an immediate drop in pressure to unaltered starting pressure 504 and then an unaltered gradual increase 506 in pressure. In certain implementations, based upon determining 204 a pitch value for vehicle 10, PBS process 200 may determine 226 an adjusted slope for the clutch pressure increase (e.g., as indicated by adjusted increase 512 in clutch pressure). In this way, for example, PBS process 200 may beneficially provide for more rapid increase in clutch pressure when vehicle 10 is operating on a slope (e.g., a slope exceeding a particular pitch) and thereby help to avoid detrimental shifting performance.

Figure 7:
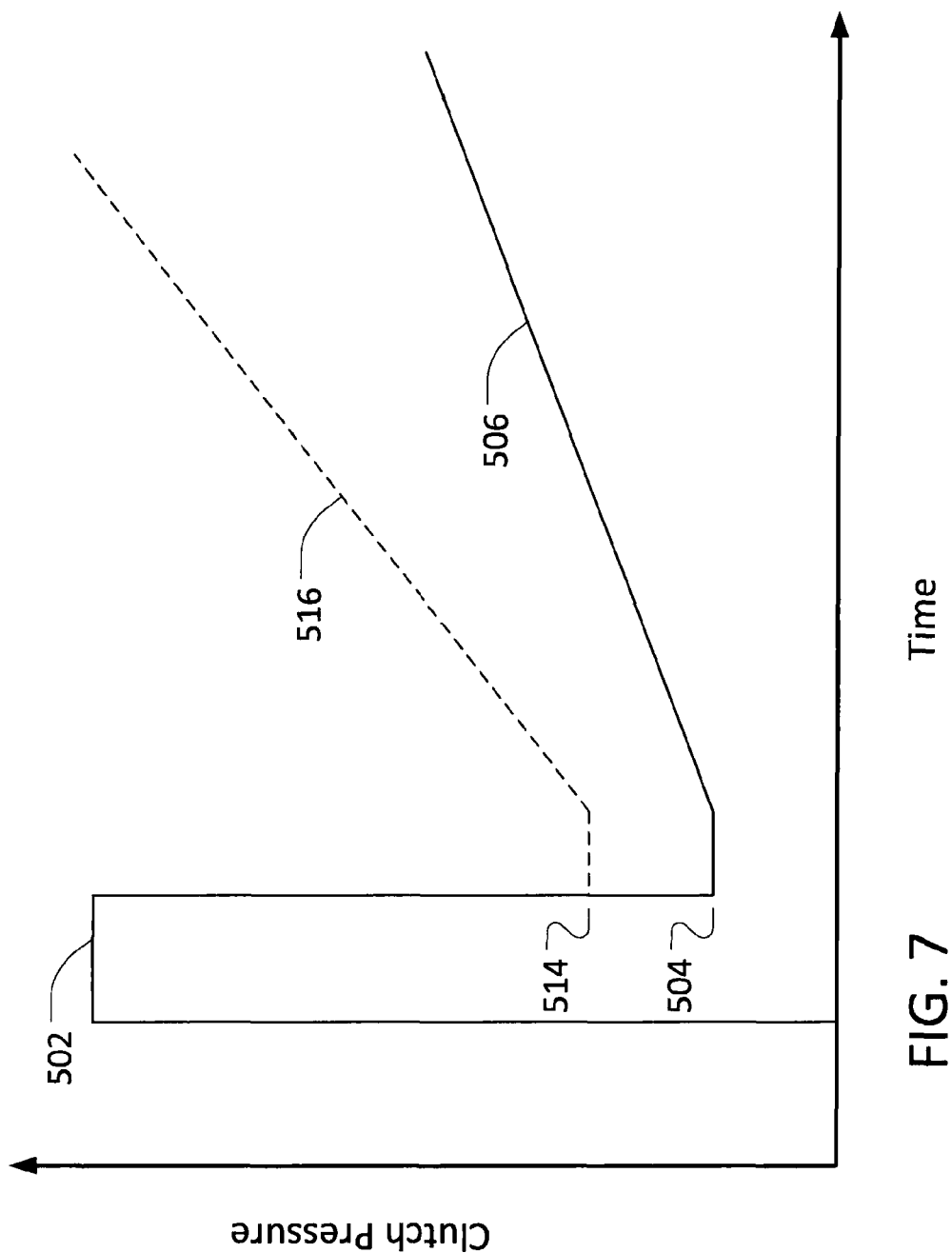

Referring now also to FIG. 7, it will be understood (as with respect to much of the functionality of PBS process 200 discussed herein), that determining 224 an adjusted clutch pressure may, in certain implementations, be combined with determining 226 an adjusted clutch pressure engagement profile (e.g., a slope or other profile of a clutch pressure command for clutch engagement or disengagement). For example, PBS process may determine that vehicle 10 is operating on a particularly steep slope and that an increase in starting clutch pressure (or an increase in clutch pressure slope) may not alone be sufficient to ensure a successful and user-friendly shift operation. Accordingly, PBS process both determine 224 an (elevated) adjusted starting clutch pressure (e.g., adjusted starting pressure 514) and may determine 226 an (elevated) adjusted clutch pressure engagement profile (e.g., adjusted clutch pressure slope 516 for increasing clutch pressure after a synchronizer has been engaged). It will be understood that such an engagement profile may exhibit various characteristics and may not necessarily be a linear profile (although portions of example profiles in the various figures may be linear). For example, clutch pressure may be increased (or decreased) with a parabolic or other curved profile, with various steps between pressure levels, and so on. Similarly, in shifting operations implicating multiple clutches (e.g., separate on-coming and off-going clutches), PBS process 200 may implement various of the improvements discussed herein, in various combinations, with respect to any (or all) of the implicated clutches.

Additionally or alternatively, PBS process 200 may implement various other functionality with respect to shifting operations. For example, still referring to FIG. 3, based upon determining 204 a pitch value for vehicle 10, PBS process 200 may determine 228 a starting time for a shift operation, may determine 230 a target gear or range for a shift operation, and may determine 232 a timing for clutch engagement in a forward-to-reverse or reverse-to-forward shifting operation. For example, based upon a determined 204 pitch value, PBS process 200 may determine when a shift is necessary (i.e., the timing of a start of an aspect of a shifting operation, such as engagement of a of synchronizer) as well as, for example, into which gear or range a shift should be made. For example, if a steeper pitch is detected 200, a shift may be determined 228 to be necessary sooner than normal (or sooner than requested by an operator) or a shift may be determined 230 to be most appropriately made to a particular gear or range (e.g., a different range or gear than indicated by a non-pitch-based shifting procedure). In certain implementations, determining 228 a starting time for a shift operation may include determining no starting time for a shift operation (i.e., determining not to execute a shift operation requested by the operator). For example, if a vehicle is operating at a steep enough pitch that a particular synchronizer shift may be likely to fail, determining 228 a starting time for such a shift may include determining 228 not to execute such a shift at all. In such a case, for example, PBS process 200 may notify the operator that the requested (or otherwise planned) shift may not be executed (i.e., because of the degree of pitch of the vehicle).

It will be understood that certain of the functionality discussed herein with respect to PBS process 200 may not be relevant to certain types of shift operations. As such, in certain implementations, only certain aspects of the discussed functionality may be utilized for particular shifting operations. For example, in certain configurations, shifting with synchronizers (e.g., cone-type synchronizers) may be viewed as a binary operation: either activating pressure is supplied (e.g., via hydro-electric actuation) or it is not. As such, PBS process 200 may not necessarily effect a change from a ramped pressure reduction/increase to an immediate reduction 216 or immediate increase 222 for certain portions of a synchronizer shift operation.

However, in certain embodiments, it may be possible to adjust the timing of the sending of various activation or de-activation signals to a synchronizer based upon the determined pitch. For example, if a vehicle is facing up a hill, a signal to activate a synchronizer may be sent sooner than it would be otherwise, in order to prevent undesirable deceleration or back-rolling down the hill (i.e., PBS process 200 may determine 228 an advanced starting time for a synchronizer shift procedure). For example, in a forward-to-reverse shuttle shift operation for a vehicle traveling uphill while moving forward, the determined 204 pitch may inform a determination that the vehicle will quickly stop once (or even as) the forward-motion synchronizer is disengaged. Accordingly, based upon the determined 204 pitch, PBS process 200 may include determining 228 to engage the reverse synchronizer before the vehicle actually comes to a complete stop (or with an otherwise altered timing). Similarly, PBS process 200 may determine, based upon the determined 204 pitch, that the vehicle is likely to roll backwards once (or even as) the forward synchronizer is disengaged. Accordingly, based upon the determined 204 pitch, PBS process 200 may include determining 228 to engage the reverse synchronizer immediately upon disengagement of the forward synchronizer (or at another appropriate time).

Likewise, in certain implementations, PBS process 200 may usefully determine 230 an appropriate (adjusted) target gear for a synchronizer shift procedure. For example, based upon a determined 204 pitch value, PBS process 200 may determine that an attempt to shift into a requested target gear would be likely to result in shift failure (e.g., because the determined 204 pitch imposes too great of an acceleration requirement on the vehicle for a particular target gear). Accordingly, PBS process 200 may determine 230 an appropriate different target gear and either directly shift to this gear or notify an operator of the determined 230 adjustment (e.g., notify the operator that the requested shift is not advisable and that a different shift may be more appropriate).

Similar considerations may apply to other shift operations, such as non-synchronized shifts using non-synchronized dog clutches. Further, PBS process 200 may implement various adjustments to pressure commands for various other clutches associated with a synchronizer shift (e.g., an upstream clutch). For example, before or after a synchronizer has been engaged or disengaged, PBS process 200 may include determining 226 an adjusted clutch pressure engagement profile, determining 220 an appropriate engagement clutch pressure, or otherwise determining particulars of a shifting operation, for a friction clutch that is upstream of the synchronizer. This may, for example, facilitate smoother transition from initial engagement of the synchronizer to a final fully-loaded state.

In certain implementations, PBS process 200 may further include determining 234 a timing for brake engagement based upon, at least in part, the determined 204 pitch value. For example, in a forward-to-reverse or reverse-to-forward shuttle shift operation, it may be useful to apply an electronically controlled brake to slow vehicle 10 (or a component of transmission 16) at various times during the shift operation. For example, if a vehicle is traveling forward down a slope, PBS process 200 may determine, based upon the determined 204 pitch, that the vehicle is unlikely to slow down appropriately when the forward synchronizer is disengaged. Accordingly, PBS process 200 may engage a brake (e.g., an electronically controlled brake) in order to appropriately slow (or stop) the vehicle before (or as) engaging the reverse synchronizer (or at another time). Similarly, if a vehicle is traveling forward uphill and a forward-to-reverse shifting operation is commanded, PBS process 200 may supplement the natural braking effect of the slope of the hill with electronically controlled braking (e.g., with a particular timing determined based upon vehicle pitch) in order to stop the vehicle more quickly and thereby speed up the transition from forward to reverse. It will be understood that various other timing (and settings) may be possible for brake engagement (and brake engagement timing) based upon a determined 204 pitch for shifting.

As will be appreciated by one skilled in the art, the disclosed subject matter may be embodied as a method, system, (e.g., a work vehicle control system included in vehicle 10) or computer program product. Accordingly, certain embodiments may be implemented entirely as hardware, entirely as software (including firmware, resident software, micro-code, etc.) or as a combination of software and hardware aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be non-transitory and may be any computer readable medium that is not a computer readable storage medium and that can communicate, propagate, or transport a program for use by or in connection with an instruction execution system, apparatus, or device.

Aspects of certain embodiments are described herein with reference to flowchart illustrations and/or block diagrams of methods, apparatus (systems) and computer program products according to embodiments of the invention. It will be understood that each block of any flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A computer-implemented shifting method for a vehicle with an associated pitch-detection mechanism including an accelerometer and a speed sensor, and one or more computing devices including one or more processor devices and one or more memory architectures coupled with the one or more processor devices, the method comprising:
   determining, by the pitch-detection mechanism, one or more indicators of a pitch of the vehicle;
   receiving, at the one or more computing devices, a signal associated with the one or more indicators of the pitch of the vehicle;
   determining, by the one or more computing devices, a pitch value for shifting based at least upon determining a first acceleration value for the vehicle using at least the accelerometer, determining a second acceleration value of the vehicle based at least upon determining a wheel speed of the vehicle using at least the speed sensor, and subtracting the second acceleration value from the first acceleration value;
   determining, by the one or more computing devices, a shift procedure based at least upon the determined pitch value; and
   implementing, by the one or more computing devices, the shift procedure to effect a shift operation of a transmission for the vehicle.

2. The computer-implemented shifting method of claim 1, wherein the shift procedure is determined to include an immediate reduction of a first clutch pressure from a current operating pressure to a shifting clutch pressure based at least upon the determined pitch value.

3. The computer-implemented shifting method of claim 2, wherein the shift procedure is further determined to include an immediate increase of a second clutch pressure from the shifting clutch pressure to an engagement clutch pressure upon identifying a ready state of a target shift range.

4. The computer-implemented shifting method of claim 3, wherein the engagement clutch pressure is determined based at least upon the determined pitch value.

5. The computer-implemented shifting method of claim 1, wherein the shift procedure is determined to include one or more of an adjusted starting clutch pressure and an adjusted clutch pressure engagement profile, the one or more of the adjusted starting clutch pressure and the adjusted clutch pressure engagement profile being determined based at least upon the determined pitch value.

6. The computer-implemented shifting method of claim 1, wherein determining the shift procedure includes determining, based at least upon the determined pitch value, one or more of a starting time for the shift procedure, a target gear for the shift procedure, and a target range for the shift procedure.

7. The computer-implemented shifting method of claim 1, wherein the shift operation is one of a forward to reverse and a reverse to forward shift operation; and
   wherein determining the shift procedure includes determining a timing for clutch engagement based at least upon the determined pitch value.

8. The computer-implemented shifting method of claim 1, wherein determining the shift procedure includes determining a timing for brake engagement based at least upon the determined pitch value.

9. A control system for shifting operations in a vehicle, comprising:
   one or more processor devices; and
   one or more memory architectures coupled with the one or more processor devices;
   wherein the one or more processor devices are configured to:
      receive a signal associated with a one or more indicators of a pitch of the vehicle, the one or more indicators being determined by a pitch-detection mechanism including an accelerometer and a speed sensor;
      determine a pitch value for shifting based at least upon determining a first acceleration value for the vehicle using at least the accelerometer, determining a second acceleration value of the vehicle based at least upon determining a wheel speed of the vehicle using at least the speed sensor, and subtracting the second acceleration value from the first acceleration value;
      determine a shift procedure based at least upon the determined pitch value; and
      implement the shift procedure to effect a shift operation of a transmission for the vehicle.

10. The control system of claim 9, wherein the shift procedure is determined to include an immediate reduction of a first clutch pressure from a current operating pressure to a shifting clutch pressure based at least upon the determined pitch value.

11. The control system of claim 10, wherein the shift procedure is further determined to include an immediate increase of a second clutch pressure from the shifting clutch pressure to an engagement clutch pressure upon identifying an engagement of a target shift range.

12. The control system of claim 11, wherein the engagement clutch pressure is determined based at least upon the determined pitch value.

13. The control system of claim 9, wherein the shift procedure is determined to include one or more of an adjusted starting clutch pressure and an adjusted clutch pressure engagement profile, the one or more of the adjusted starting clutch pressure and the adjusted clutch pressure engagement profile being determined based at least upon the determined pitch value.

14. The control system of claim 9, wherein determining the shift procedure includes determining, based at least upon, the determined pitch value, one or more of a starting time for the shift procedure, a target gear for the shift procedure, and a target range for the shift procedure.

15. The control system of claim 9, wherein the shift operation is one of a forward to reverse and a reverse to forward shift operation; and
wherein determining the shift procedure includes determining a timing for clutch engagement based at least upon the determined pitch value.

16. The control system of claim 9, wherein determining the shift procedure includes determining a timing for brake engagement based at least upon the determined pitch value.

17. The computer-implemented shifting method of claim 4, wherein the determined pitch value corresponds to the vehicle operating on a significant slope.

18. The control system of claim 12, wherein the determined pitch value corresponds to the vehicle operating on a significant slope.

* * * * *